United States Patent
Reinhard

(10) Patent No.: US 8,226,043 B2
(45) Date of Patent: Jul. 24, 2012

(54) AUTONOMOUS STRATOSPHERE PLATFORM

(75) Inventor: Andreas Reinhard, Zurich (CH)

(73) Assignee: III-Solutions GmbH, Glattbrugg (CH)

( * ) Notice: Subject to any disclaimer, the term of this patent is extended or adjusted under 35 U.S.C. 154(b) by 636 days.

(21) Appl. No.: 12/225,250

(22) PCT Filed: Jun. 30, 2006

(86) PCT No.: PCT/CH2006/000350
§ 371 (c)(1),
(2), (4) Date: Aug. 27, 2009

(87) PCT Pub. No.: WO2007/107018
PCT Pub. Date: Sep. 27, 2007

(65) Prior Publication Data
US 2009/0302165 A1      Dec. 10, 2009

(30) Foreign Application Priority Data

Mar. 21, 2006  (CH) ........................................ 437/06

(51) Int. Cl.
*B64D 17/08* (2006.01)
(52) U.S. Cl. ...................... 244/138 R; 244/152; 244/142
(58) Field of Classification Search .............. 244/138 R, 244/142, 147, 149, 152, 123.11
See application file for complete search history.

(56) References Cited

U.S. PATENT DOCUMENTS 3,773,284 A     11/1973  Matsuo et al.
4,659,940 A *   4/1987   Shepard ........................ 290/55
6,131,856 A *   10/2000  Brown .......................... 244/152
2004/0169111 A1* 9/2004  Christof ........................ 244/152
2005/0230555 A1 10/2005  Strong

FOREIGN PATENT DOCUMENTS

DE      4336056         4/1995
WO      WO-03018401     3/2003

OTHER PUBLICATIONS

Weber, Carlos, International Search Report for PCT/CH2006/000350 as mailed Dec. 6, 2006 (2 pages).

* cited by examiner

*Primary Examiner* — Tien Dinh
*Assistant Examiner* — Nicholas McFall
(74) *Attorney, Agent, or Firm* — Winstead PC

(57) ABSTRACT

The present invention relates to an autonomous stratosphere platform which is preferably intended to be positioned in the stratosphere, is carried by a carrying shield (1) and is controlled by a control and drive unit (3) which can use control elements (301) to control the carrying shield (1) via lines (302). A cable (5) is used to connect the control and drive unit (3) to a capsule (2) which is intended to hold a payload and the requisite electrical and electronic components for operating the autonomous stratosphere platform. A control element (8) having an anchoring shield (6) is fastened to the capsule (2), again on a cable (5). The stratosphere platform experiences uplift as a result of the wind gradient between the wind layer of the anchoring shield (6) and that of the carrying shield (1). The control element (8) and the control and drive unit (3) contain at least one respective GPS receiver and radio means for transmitting their coordinates to a receiver in the capsule (2), as well as a respective cable pulley for changing the length of the cable (5). The cable (5), the capsule (2), the control and drive unit (3) and the control element (8) have radar transponders (9) or Lüneburg lenses for passive localization.

13 Claims, 4 Drawing Sheets

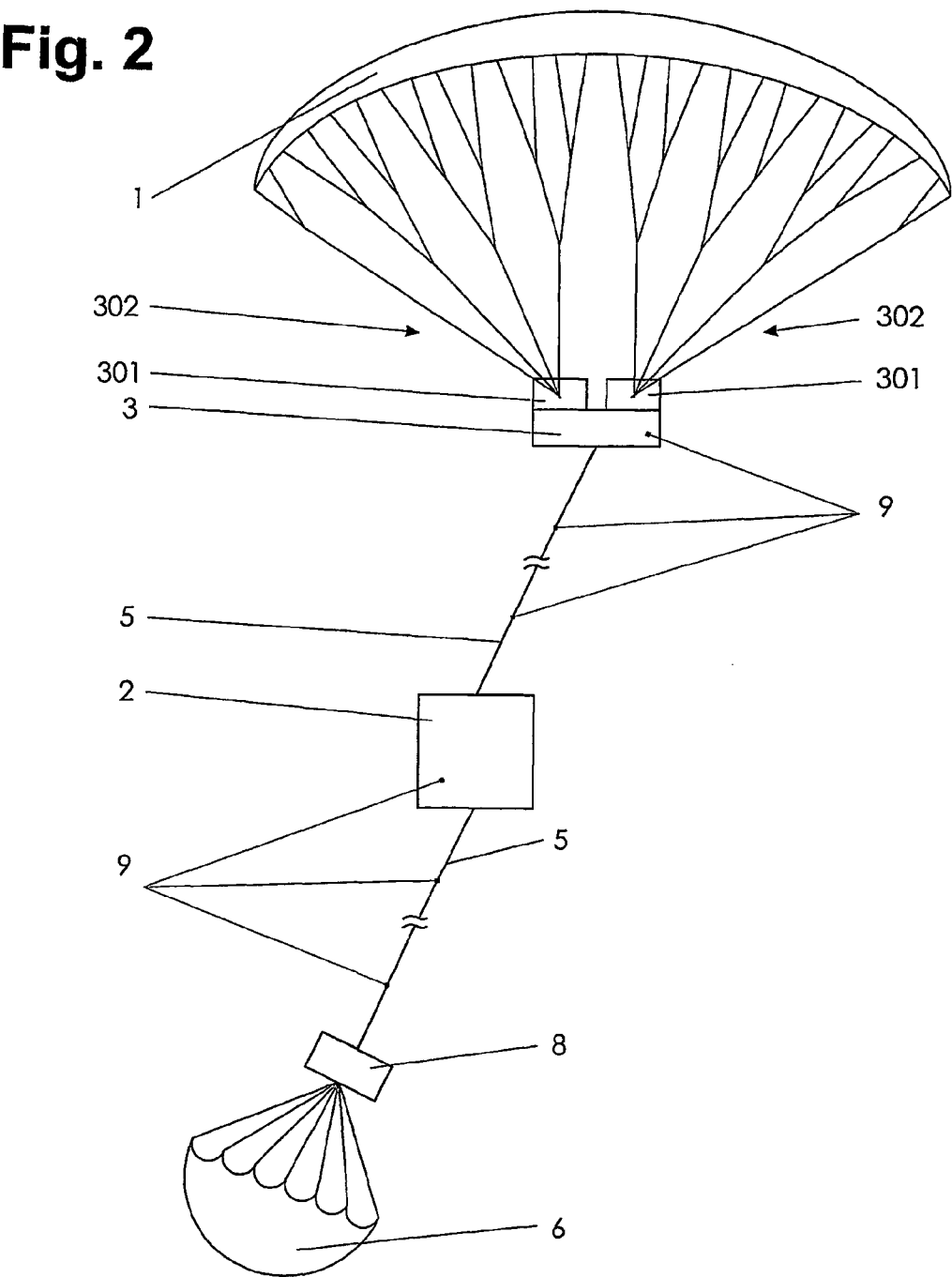

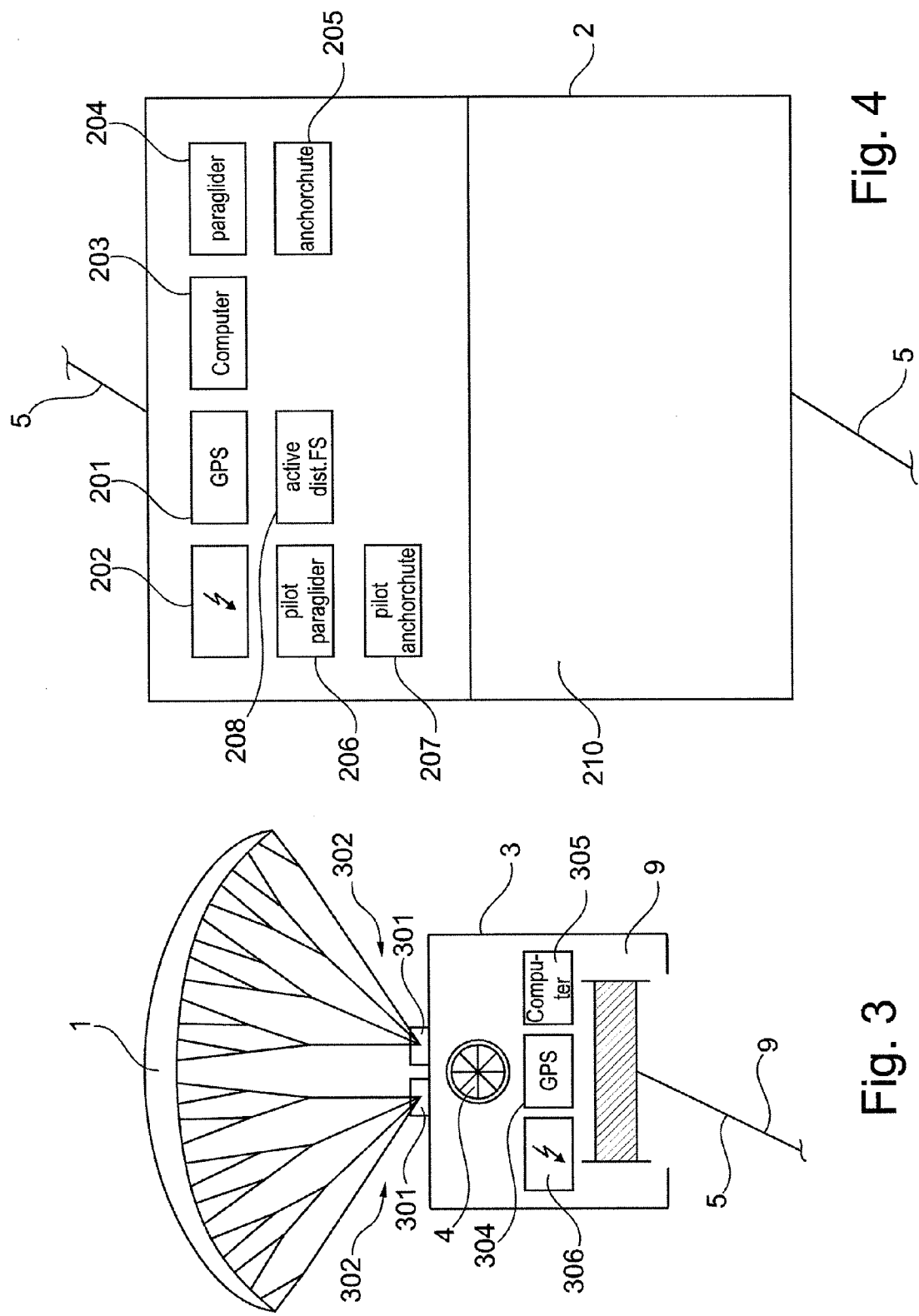

AUTONOMOUS STRATOSPHERE PLATFORM

Figure 1A:
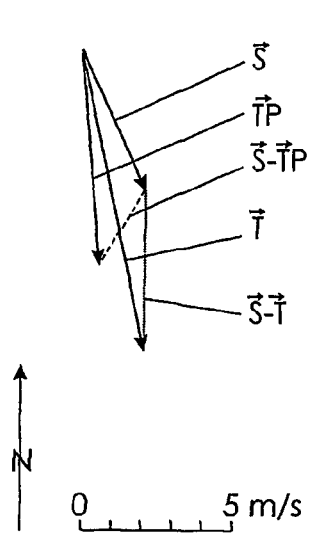
Figure 1B:
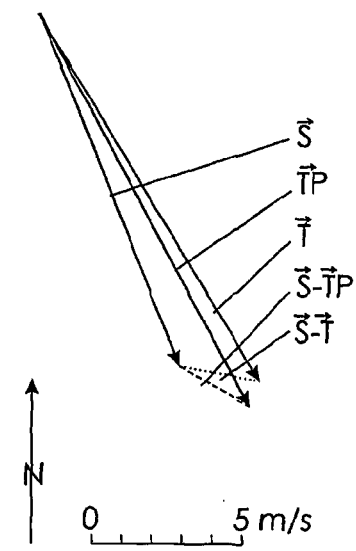
Figure 1C:
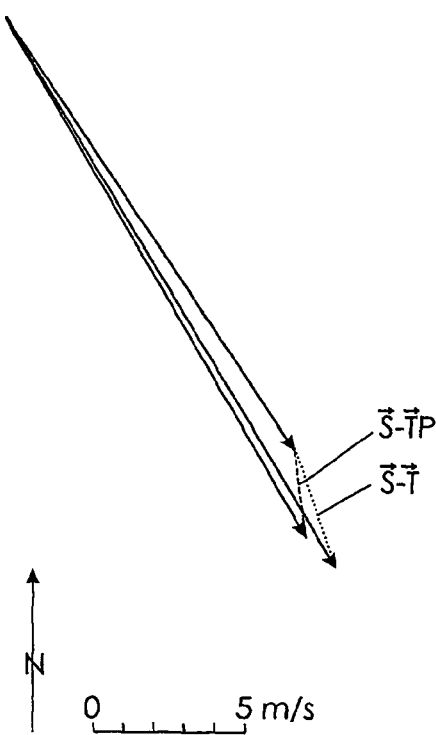
Figure 1D:
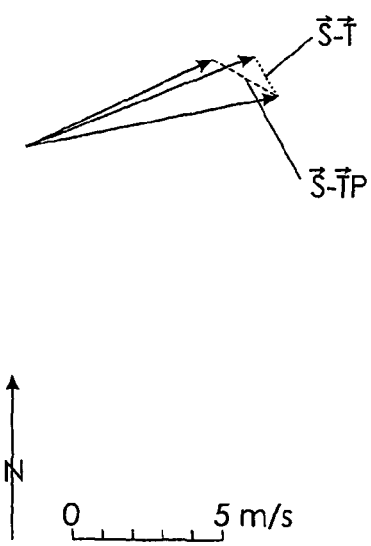

The present invention relates to a station, preferably localized in the stratosphere, for carrying payloads and for receiving and transmitting radio signals according to the preamble of claim 1.

Such stations are known per se and are usually carried by aerostats or carried and transported by suitable manned or unmanned aircraft. Apart from their instrumentation, such transport means are complex to construct and costly to operate.

Instrumentation carried by a paraglider is also known from WO 03/018401, which moves computer-controlled on a predefined flight path, for example. Such an apparatus cannot meet the requirements for a station localized at a specific altitude, however, because paragliders and parachutes of the type described fundamentally follow downwardly directed flight paths.

The object of the present invention is to provide a platform, referred to hereafter as "capsule" in short, which is capable without external energy of carrying a payload and at least flying to a predefined height and stopping if possible, but also displacing itself in a targeted manner. The achievement of the stated object is provided in the characterizing part of claim 1 in regard to the essential features, and in the further claims in regard to further advantageous embodiments.

The idea according to the invention is based on the finding that the tropopause often appears as an interface for the wind conditions in the stratosphere and those in the troposphere; wind conditions referring to the wind vector according to direction and strength. Of course, not only the tropopause comes into consideration here as an interface. Any height difference over which a wind gradient may be established in a vectorial regard allows the use of the device according to the invention.

Therefore, on the one hand an airfoil generating lift and propulsion, which operates in the upper employed wind layer, and on the other hand a wing acting as a wind anchor, which is used in the lower wind layer, are essential to the device according to the invention. For example, a paraglider is to be provided as the cited airfoil, and a round chute acting as a brake, whose degree of unfolding is controllable, is to be provided as the wind anchor, for example. However, a paraglider, or more generally a controllable wing, is also usable as the wind anchor. A device which allows probing within the atmospheric conditions at which altitudes the conditions for the most favorable possible wind gradients according to direction and strength exist is the third component. Pilot paragliders, or, more generally, pilot wings provided with lift and also pilot anchor chutes for the air layers lying below the capsule are provided for this purpose. Instead of these aerodynamic bodies, a LIDAR Doppler system may also be used (LIDAR=light detection and ranging), using whose results the direction and altitude of wind flows may be ascertained. Stated more generally: an optoelectronic system.

The cited capsule is connected to the airfoil, i.e., suspended directly thereon or using a cable of selectable length, which on one hand contains the required electrical and electronic control elements including a computer, powered by an autonomous power supply, and on the other hand may be used as a high-altitude platform for scientific experiments, for electronic communication means, and similar tasks, for example.

Figure 5:
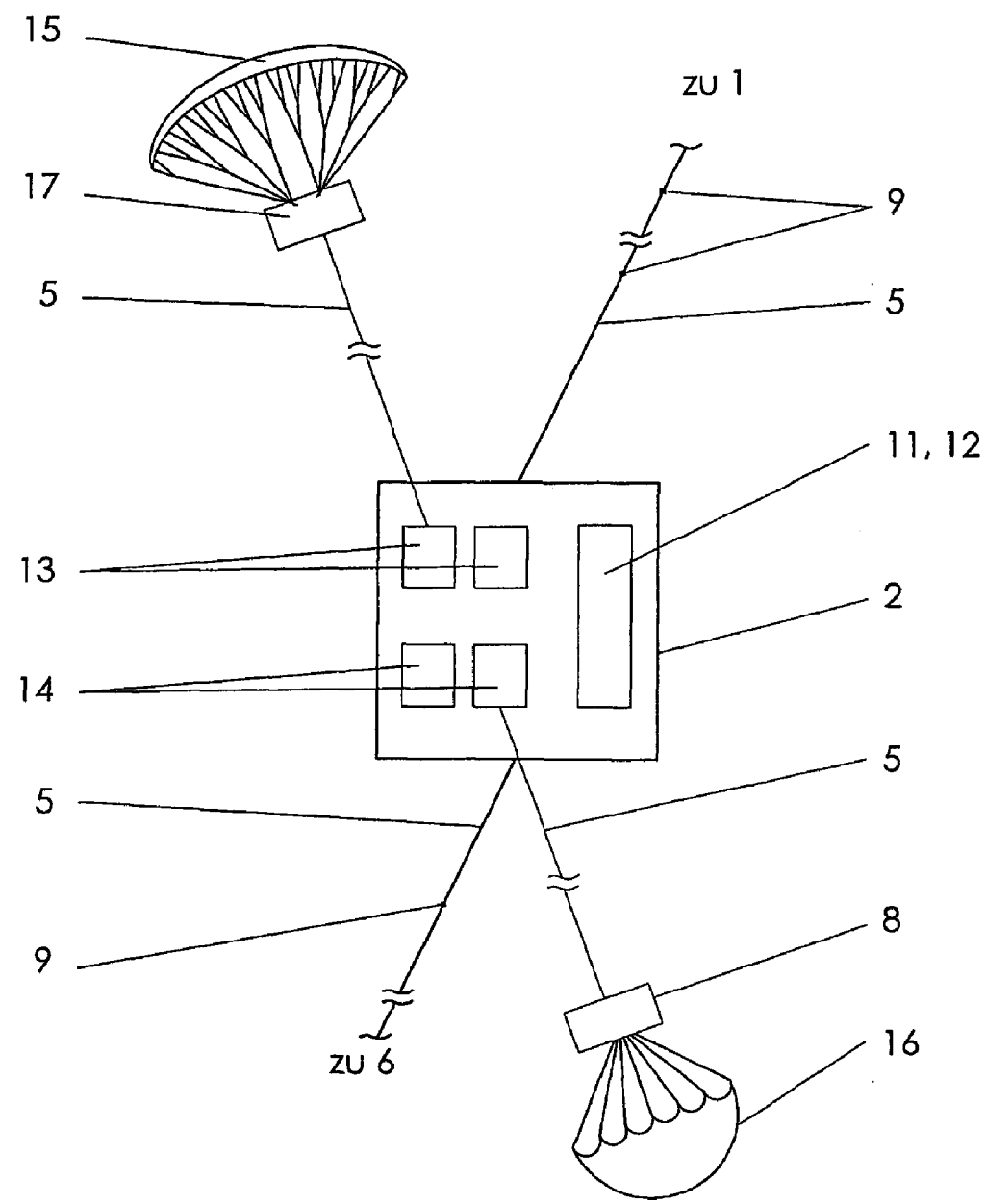

The invention is explained in greater detail on the basis of the appended drawings. In the figures FIGS. 1a-d show wind vectors and their differential vectors, FIG. 2 shows a schematic illustration of a first exemplary embodiment, FIG. 3 shows a schematic illustration of a control and drive component for a support chute, FIG. 4 shows a schematic illustration of a capsule, FIG. 5 shows a schematic illustration of the entire device according to the invention.

The idea on which the device according to the invention is based is to provide the desired lift to the support chute 1 using the wind directions and strengths prevailing at the height of the support chute 1 described hereafter and those prevailing at the height of the anchor chute 6, also described hereafter, i.e., using the wind differential vectors, and to support the platform using this lift.

FIGS. 1a through 1d show wind vectors as have resulted from the radio probes—randomly selected meteorologically—having ascension location Payerne (CH). In each case, one vector S in the stratosphere (solid), one vector TP in the tropopause, and one vector T in the upper troposphere are shown. Furthermore, two differential vectors $$\vec{D}_{TP} = \vec{S} - \vec{T}P \text{(dashed)}$$

and $$\vec{D}_T = \vec{S} - \vec{T} \text{(dotted)}$$

are shown. The data of the probes are recorded in the base of FIGS. 1a-1d. Except for the season, the weather is not subject to any statistical regularity; therefore, the selection of the probe data offers statistical randomness.

The fundamental construction of an exemplary embodiment of the device according to the invention is shown in a simplified illustration according to FIG. 2. A capsule 2, which contains both the provided equipment of electrical and electronic components, and is also set up to receive a payload, hangs on a support chute 1. The capsule 2 is shown in greater detail in FIG. 3. Components for power generation are attached to the capsule 2, as shown in FIG. 3, for example, coaxial wind turbines 4 which rotate in opposite directions here, however, and are coupled to one or two generators. The opposite running of the wind turbines 4 prevents an undesired gyroscope effect from acting on the capsule 2 as well as reaction torques on the capsule 2 and cables 5 described hereafter. Instead of the wind turbines 4, the capsule 2 may also be alternatively or additionally equipped with solar cells, whose generated power may be stored overnight in batteries. The surface of the support chute 1 may also be covered by ultrathin and flexible solar cells.

Cables 5 are attached to both the top and also the bottom of the capsule 2. The upper cable 5 runs to the support chute 1, which carries the capsule 2. This is a flat chute controllable via control lines, for example, as is also known from paragliding. The use of another controllable wing is also according to the invention, for example, having pneumatic construction or a rigid wing.

Instead of a single support chute 1, the use of more than one is also according to the invention, the multiple support chutes 1 operating in the same wind layer, i.e., at the same height. As shown in detail in FIG. 3, a control and drive unit 3 hangs on the support chute 1, which has control components 301 placed on top on one hand for actuating corresponding lines 302 of the support chute 1, and also an instrument unit having radio means 303, a GPS receiver 304, and a computer 305. Furthermore, a pulley 306 having a drive motor is incorporated, which may unroll and roll the cable 5, which connects the control and drive unit 3 to the capsule. The control and drive unit 3 is set up autonomously in regard to power, for which it in turn carries wind turbines 4 and/or solar cells. Both the control and drive unit 3 and also the cable 5 carry a sufficient number of radar transponders 9 and/or Luneberg lenses for passive location by air traffic.

A further cable 5 is fastened in the bottom part of the capsule 2, on whose lower end an anchor chute 6 is attached on a control component 8. Using this control component 8, the unfolding of the parachute 6 may be controlled. A further pulley 306 including a drive motor is housed in the control component 8. Situating this second, lower pulley 306 in the capsule 2 is also included in the idea according to the invention. The control component 8 has the devices cited for the control and drive unit 3, namely a control component 801 for actuating a device (not shown, but known per se) for varying the degree of unfolding of the anchor chute 6, radio means 303, a GPS receiver 304, and a computer 305. The radio means 303 are also used, as in the control and drive unit 3, to transmit the coordinates established by the GPS receiver of the anchor chute 6, to receive control commands to the control component 8 for the control component 801 and to the motor of the pulley 306.

The cable preferably comprises Aramid fibers or a comparable material having high tensile strength and little stretch. The length of the cable 5 may be selected as so great, for example, several hundred meters to several kilometers, that the anchor chute 6 is located in a different wind flow—both according to direction and also according to strength—than the support chute 1. The support chute 1 is then carried, in consideration of the flow resistances of support chute 1 and anchor chute 6, by the differential vector of the wind velocities at the height of the support chute 1 and of the anchor chute 6. Thus, for example, the support chute 1 may be situated above the tropopause, and the anchor chute 6 in the tropopause, or also may be placed in the troposphere. Through suitable selection of the altitude of support chute 1 and anchor chute 6, wind differential vectors $D_{TP}$ and/or $D_T$ of 10 m/second and more may be found easily.

The illustration of the station 2 from FIG. 4 shows instrumentation according to the invention. Of course, this instrumentation may be expanded or altered if other requirements indicate this.

The capsule is shown schematically but in detail in FIG. 4. For example, the functional groups required for the operation of the device according to the invention are situated in the upper part of the capsule. A GPS receiver 201 ascertains the coordinates of the capsule 2, a radio unit 202 for all of the radio traffic on all provided frequencies, a computer 203 ("computer") for all ascertainment and control functions of support chute 1 and anchor chute 6, and further functions described hereafter.

For example, in the lower part of the capsule 2, but in no way exclusively therein, space and the terminals (not shown) for current and data lines for a payload are located. Such a provided payload may comprise instruments, devices, and apparatus for scientific and technological tasks and experiments, for example. The payload, also including antennas provided for this purpose, may also be suspended on the capsule 2 instead of in the capsule 2.

Further supplements according to the invention are shown in FIG. 5 on the foundation of FIG. 2. The capsule 2 is again shown in simplified form here. In addition to a container 12 for a descent parachute 11, still further containers 13, 14 are shown in FIG. 5. The containers 13 each contain a so-called pilot paraglider 15. These may be extended if the need exists to ascertain the wind direction in air layers above the station.

Each pilot paraglider 15 carries a control unit 17—preferably having integrated power generation, as described. The pilot paraglider 15 is shown simplified, but has all the necessary features for influencing the flight direction and the angle of attack, as described for the support chute 1. The necessary pulley 306 having drive motor is preferably also installed in the control unit 17. Instead of paragliders, of course, adequately controllable round chutes may also be used for their purpose, as are used for so-called parasailing, for example. The use of gas balloons which are not elastically strained is also according to the invention, for which a filling and emptying station may be provided in the capsule 2.

A GPS receiver and radio transceiver is again installed in the control unit 17 for determining location and transmitting the data and for receiving necessary control commands. The pilot paraglider 15 is controlled computer-supported by the computer 203. Pilot anchor chutes 16 are housed in the containers 14, similarly to the pilot paragliders 15 for probing the wind conditions prevailing above the capsule 2. These are also equipped with control components 8, which may contain all elements already noted, including the power supply. The drift on the ground of the wind conditions prevailing in the lower air layers may be ascertained via their coordinates ascertained using GPS by the computer 306 and in relation to the coordinates of the capsule 2.

It is also according to the invention to extend one pilot paraglider 15 and one pilot anchor chute 16 each an equal distance to make the forces acting on the capsule 2 symmetrical. Their pulleys may also be situated in the capsule 2. The pilot anchor chutes may also be implemented as support chutes; either like the support chute 1 or the pilot paragliders 15.

Balloons may also be provided instead of the anchor chutes 6, whose net lift is selected as less, so that they move downward from the capsule 2.

It is also according to the invention to connect the capsule 2 directly to the control and drive component 3, and to integrate the components situated therein—leaving out the pulley 306 and the GPS receiver 304 belonging to the support chute 1—in the capsule 2.

Instead of pilot paragliders 15 and/or pilot anchor chutes 16, the use of a LIDAR system (LIDAR=light detection and ranging) may also be provided or a suitable optoelectronic system in general. Such a system is situated on or in the capsule 2, on a stabilized platform in any case.

A LIDAR system may ascertain the velocity and the direction of wind flows including their location in space using coherent laser pulses. Such systems are known per se.

The capsule 2 may be brought into its intended position either by a ground start on the support chute 1, by an aerostat, by an aircraft, or by a rocket. For all types of transport, the required control commands are either preset in the computer 203, or may be transmitted manually to the capsule 2 by radio.

The capsule 2 may return to the ground either on the support chute 1 or on a parachute 11, which is stowed in the container 12 according to FIG. 5. This parachute 11 may be used for both a planned and also an emergency descent of the capsule 2. Controllable flat or round chutes may also be used for the parachute 11. If the capsule 2 is connected using the cable 5 to the support chute 1, the cable 5 is advantageously to be retracted before the descent, so that the capsule is connected directly to the support chute 1 and a soft landing may be made for the descent of the system support chute 1—capsule 2 using the controller of the support chute 1.

The invention claimed is:

1. An autonomous stratosphere platform for carrying a payload and keeping the payload in a definite location in a stratosphere, the autonomous stratosphere platform comprising:
   a support chute;
   a control and drive component, coupled to the support chute, the control and drive component comprising at least one first control component for controlling the support chute via a first plurality of lines;
   a capsule suspended from, the support chute and the control and drive component via a first cable, the capsule containing the payload;
   a second control component positioned below the capsule and coupled thereto by a second cable;
   an anchor chute coupled to the second control component by a second plurality of lines;
   wherein the second control component varies a length of the second plurality of lines and a shape of the anchor chute such that an angular position of the anchor chute relative to the support chute is varied;
   wherein the support chute and the anchor chute utilize a plurality of wind vectors in differing altitudes within the stratosphere to produce lift to maintain the capsule at a substantially fixed altitude; and
   wherein the support chute and the anchor chute utilize the plurality of wind vectors in differing altitudes within the stratosphere to produce drift to maintain the capsule at the definite location within the stratosphere in a range of approximately 6 kilometers to approximately 18 kilometers above ground.

2. The autonomous stratosphere platform according to claim 1, wherein:
   the control and drive component comprises
   a pulley having a drive motor for varying a length of at least one of the first cable and the second cable.

3. The autonomous stratosphere platform according to claim 2, wherein the control and drive component comprises:
   a power generation unit having at least one of a wind generator or a solar cell;
   a GPS receiver;
   a computer; and
   radio means.

4. The autonomous stratosphere platform according to claim 1, wherein the second control component comprises:
   a power supply unit having at least one of a wind generator or a solar cell;
   a pulley having a drive motor;
   a GPS receiver;
   a computer; and
   radio means; and
   a control component for varying at least one of a degree of unfolding and a lift of the anchor chute.

5. The autonomous stratosphere platform according to claim 1, further comprising:
   at least one pilot paraglider;
   at least one pilot anchor chute;
   at least one decent parachute;
   wherein, the capsule comprises:
   a GPS receiver for ascertaining coordinates of the capsule;
   a radio unit for transmitting control commands to at least one of the control and drive component and the second control component;
   a computer at least for all ascertainment and control functions of the support chute and the anchor chute;
   a first control unit for the support chute;
   a second control unit for the anchor chute; and
   activation units for at least one of the at least one pilot paraglider, the at least one pilot anchor chute, and the at least one descent parachute.

6. The autonomous stratosphere platform according to claim 5, wherein the capsule contains at least one of a LIDAR Doppler system or an optoelectronic system for ascertaining direction and strength of air flows in a selected air layer.

7. The autonomous stratosphere platform according to claim 5, wherein the capsule comprises:
   a plurality of instruments for scientific and technological experiments; and
   a plurality of terminals for power and data lines.

8. The autonomous stratosphere platform according to claim 5, wherein the anchor chute is a controllable wing.

9. The autonomous stratosphere platform according to claim 5, wherein the at least one pilot anchor chute is a controllable wing.

10. The autonomous stratosphere platform according to claim 8, wherein
    the capsule comprises first containers for the at least one pilot paraglider and the at least one pilot anchor chute;
    the at least one pilot paraglider comprises a third control unit equipped essentially identical to the control and drive unit; and
    the at least one pilot anchor chute is carried by the second control component.

11. The autonomous stratosphere platform according to claim 8, wherein the capsule comprises a second container in which a parachute is stowed.

12. The autonomous stratosphere platform according to claim 6, wherein the capsule comprises:
    third containers for receiving a plurality of pilot balloons for probing wind conditions in air layers above and below the capsule; and
    wherein each of the plurality of pilot balloons carries a third control unit equipped essentially identical to the control and drive unit.

13. The autonomous stratosphere platform according to claim 12, wherein the third containers comprise a device for at least one of filling and emptying the pilot balloons.

* * * * *